Figure 3:
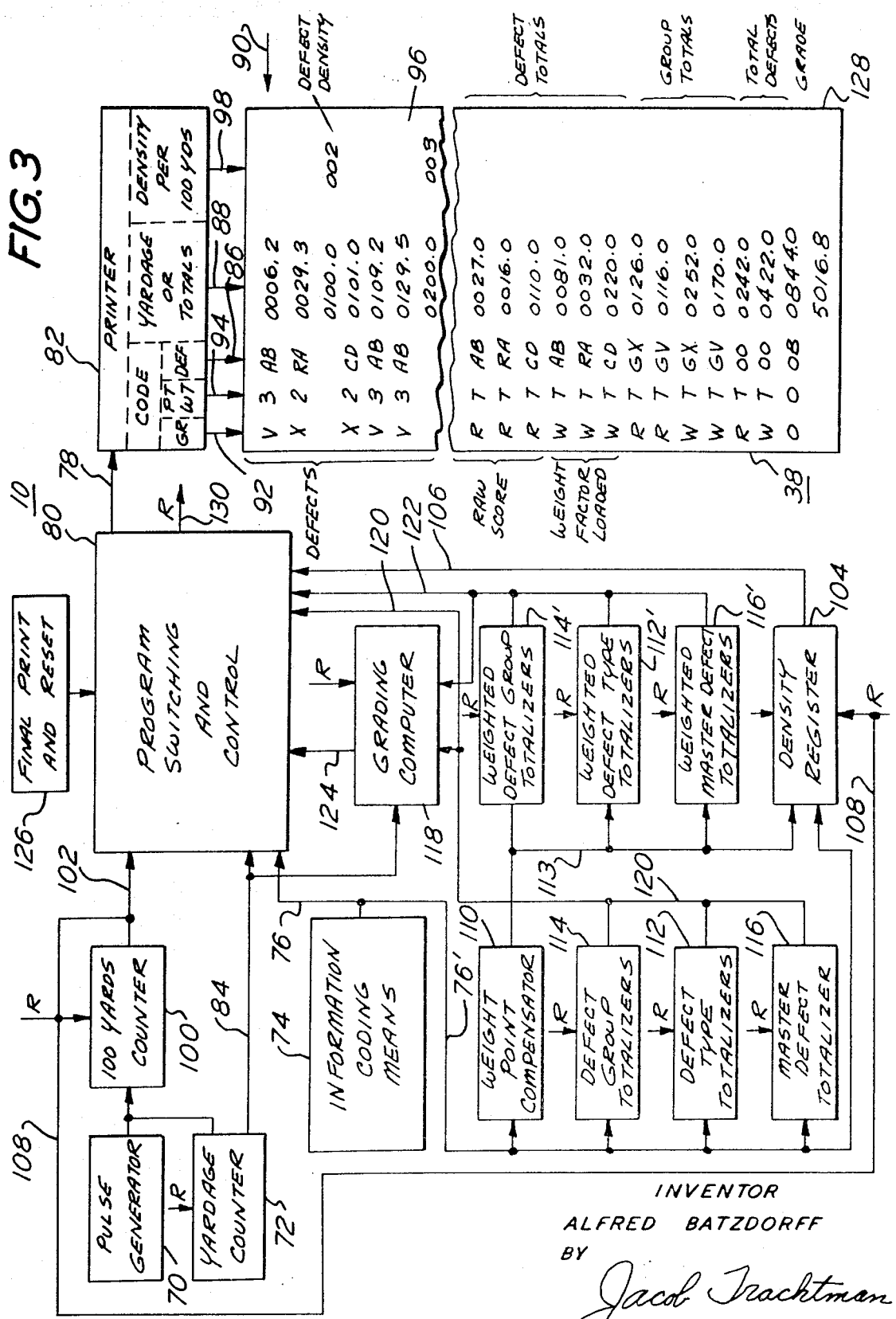

United States Patent

[11] 3,633,211

[72] Inventor Alfred Batzdorff
Langhorne, Pa.
[21] Appl. No. 867,257
[22] Filed Oct. 17, 1969
[45] Patented Jan. 4, 1972
[73] Assignee American Electronic Laboratories, Inc.
Colmar, Pa.

[54] INSPECTION RECORDER MEANS
20 Claims, 3 Drawing Figs.

[52] U.S. Cl. .................................................. 346/14,
26/70, 346/33 F, 246/51, 235/92 PD
[51] Int. Cl. ........................................................ D06h 3/02
[50] Field of Search .......................................... 346/33 F,
14, 51, 79, 61; 73/159; 26/70; 356/199, 200;
250/219 DF, 219 WE; 235/92 PD

[56] References Cited
UNITED STATES PATENTS
2,930,228   3/1960  Lawrence et al. ............  73/159

3,094,368   6/1963  Peck .............................. 346/33 F
3,251,112   5/1966  Ingham ......................... 346/33 F X
3,510,664   5/1970  Nichols ........................ 250/219 DF X Primary Examiner—Joseph W. Hartary
Attorney—Jacob Trachtman ABSTRACT: Inspection recorder means for recording defects in elongated sheet material traveling past an inspection station comprising measuring means for maintaining a current count of the length of material which travels past an inspection station, information coding means for providing a signal upon detection of a defect in said material as it passes said inspection station, and recording means making a record of each signal from said coding means together with the count of said measuring means at the respective time each signal is provided by said coding means. Said means also providing and recording total defects by type, group and also weighted number of defects by type and group, density of defects, and grading of the material.

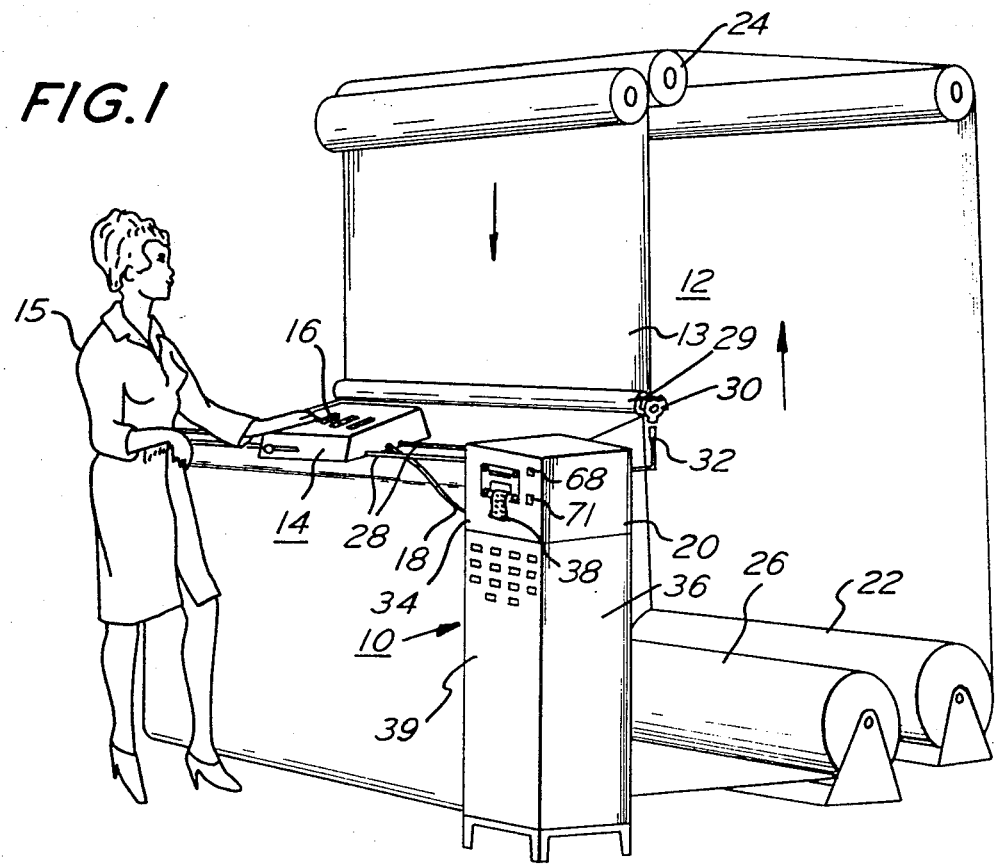

INSPECTION RECORDER MEANS

This invention relates to an inspection recorder means and particularly means for recording defects in elongated sheet material and providing a record of the number of defects by type and group, and weighted number of defects by type and group, density of defects, and grading of the material.

Heretofore inspection devices have been provided for recording defects in elongated sheet material which have utilized recording tapes moving in synchronism with the sheet material and recording defects in positions on such record to correspond with the appearance of the defects on the traveling material. Such analog means for recording the position of the defects, has the disadvantage of not providing information in concise form and does not permit ready processing of such data to provide other information which may be desirable with respect to such material, such as density of defects and the weighting of defects and grading thereof.

A principal object of the invention is to provide a new and improved inspection recorder means for concisely and accurately recording information in digital form.

Another object os the invention is to provide new and improved means to allow an operator to quickly and efficiently make a record of defects appearing in a traveling elongated sheet of material by manipulating respective keys of a keyboard resulting in the automatic recording of the type of defect and its location in digital form on a record sheet in the sequence that such keys are actuated.

Another object of the invention is to provide a new and improved inspection recorder means which receives information with regard to types of defects appearing in an elongated sheet of material being inspected and provides recorded information with regard to the total defects by types and/or groups of defects, and also provides weighted totals by types and groups and other information relating to density of defects and grading of the respective material.

Another object of the invention is to provide a new and improved inspection recorder means which provides a printed record in concise form which may be attached to an inspected elongated sheet of material giving in serial form the locations of defects found as well as total defects by types and groups and total weighted defects by types and groups as well as density of defect information and grading for the inspected material.

Another object of the invention is to provide an improved inspection recorder means for providing a highly accurate record of defects and their locations with a minimum of effort and a reduced possibility for error.

The above objects of the invention as well as many other advantages are achieved by providing an inspection recorder means comprising a measuring means maintaining a current count of the length of material which travels past an inspection station, information coding means for providing a signal upon detection of a defect in said material as it passes the inspection station and recording means making a record of each signal from said coding means together with the count of said measuring means at the respective time each signal is provided by said coding means. The recording means provides a record in digital form of the signals from said coding means with the corresponding count of said measuring means for identifying and locating each type of defect being recorded.

The measuring means may comprise a detector providing a pulse signal for each predetermined length of material passing said station, such as a pulse for each one-tenth of a yard, and a counter receiving said pulses and maintaining a current count of the length of material traveling past the inspection station. The coding means may comprise a keyboard with a plurality of keys for manual actuation by an operator for providing respective coded signals corresponding to a plurality of types of defects to be recorded, or the coding means may be actuated by automatic defect detection means for providing the respective coded signals corresponding to the respective types of defects to be recorded as they pass the inspection station.

The inspection recorder means may also be provided with storage means for maintaining a count of the signals provided by the coding means corresponding to the number of defects detected. The storage means may also provide pluralities of registers for recording such defects by type and group, and also for registering weighted counts by types and groups of defects. Means may also be provided for registering the density of defects and for grading the material being inspected. In addition to registering defects, the recording means prints out on a record sheet the defects by type and group, as well as total defects by type and group. The density of defects and the grading of the material being inspected are also provided on said record sheets at the end of an inspection run.

The inspection recorder means may also provide a panel allowing an operator to see the registered figures such as the current total defects by group and type, weighted and unweighted, during an inspection.

The foregoing objects of the invention will become more apparent as the following detailed description of the invention is read in conjunction with the drawings, in which:

FIG. 1 diagrammatically illustrates an installation at an inspection station of inspection recorder means embodying the invention for use by an operator in the inspection of elongated sheet material traveling past such station, FIG. 2 illustrates a panel of the inspection recorder means for visibly providing current information as it is being recorded during an inspection run and at the termination of an inspection run, and FIG. 3 is a block diagram of the inspection recorder embodying the invention.

Like reference numerals designate like parts throughout the several views.

Referring to the figures, FIG. 1 illustrates the inspection recorder means 10 installed at a station 12 where elongated sheet material 13 such as woven fabric travels past the station 12 for having defects recorded by an operator 15. The inspection recorder means 10 comprises a keyboard 14 positioned for convenient use by the operator 15. The keyboard 14 is provided with a plurality of keys 16 corresponding to the various types of defects which are to be recorded. The keys 16 may be color coded and arranged in groups to represent respective types of defects and groups of defects according to design requirements. The keyboard 14 is connected by a flexible cable 18 with the printing, registering and computing apparatus 20 of the means 10 which may be housed in a console.

The material 13 to be inspected may be provided by a supply roll 22 and passed over guide rollers 24 past the inspection station 12 for easy inspection by the operator 15 and thereafter returned to a takeup roll 46 with appropriate motive means. The keyboard 14 may be movably mounted on a pair of parallel rails 28 for most convenient use while the console housing apparatus 20 is positioned on the floor proximate to the keyboard 14.

For the purpose of determining position and measuring the length of material 13 passing the station 12, one of the guide rollers 29 is provided at its end with a wheel 30 having extensions about its periphery. A proximity detecting unit 32 of the well-known type is positioned proximate the wheel 30, so that as the wheel 30 rotates, the unit 32 generates a pulse signal which is delivered to the apparatus 20 each time an extension of the wheel 30 moves proximate to the unit 32. The extensions on the wheel 30 are so arranged that a pulse is generated by the detector 32 for each tenth of a yard of material 32 which passes the station 12. Of course, other means may be used, such as photoelectric cell and light source, in which the light source is periodically interrupted by the extensions on the wheel 30 for generating the pulse signals, as well as any other such means for producing signals responsive to the measured movement of the material 13 past the inspection station 12.

The apparatus 20 provides a printer section 34 which prints out on a tape 38, (a) the coded representation for the defect corresponding to the key 16 actuated by the operator 15 and (b) the yardage or length of material 13 at which the defect is detected. Thus the section 34 provides a series of print-outs corresponding to the keys 16 depressed by the operator giving the type of defect and its location. The printing out may be in coded form utilizing binary representations or may use an alphabetical or numerical code symbolism for representing the type of defect and yardage count where the defect occurred.

As illustrated in FIG. 1, the apparatus 20 is also provided with a storage and computer section 36. The storage of section 36 provides a plurality of registers which are visible on the front panel 39 as illustrated in greater detail in FIG. 2. Thus, as information as to the type of defect detected is delivered from the keyboard 14 over the cable 18 to the apparatus 20, such information is received and stored by the plurality of registers, and the stored information is displayed on the panel 39. The windows 40, 42 and 44 in panel 39 provide the current count of three types of defects designated by the code letter combinations AB, RA, and CD. Since various types of defects may be considered more serious than others, different weightings may be assigned to respective types of defects and a weighted count may be stored by another series of registers. The weighted counts are displayed at windows 46, 48 and 50 with the coded symbols used to designate such weighted current totals being shown as WAB, WAR and WCD. Thus during the inspection run, the operator may view the raw and weighted scores displayed by the registers 40–44, and 46–50 should such information be desirable at any time.

Of course, while only three types of defects are used for purposes of illustration, many types and classifications of defects may thus be recorded, registered and printed. As noted previously, certain defects may be combined in groups for purposes of evaluation and scoring. The panel 39 includes windows 52 and 54 at which may be observed the current totals of registers keeping score of respective defects provided in groups X and V and such scores are symbolically represented as GX and GV. As compared to the raw score provided on the counts of defects occuring in groups X and V, the windows 56 and 58 allow observation of weighted scores for the groups of defects X and V, which weighted groups are represented by the code letters WGX and WGV.

The windows considered thus far disclose the respective counts of various types of defects and groups of defects, while the window 60 provides the raw or unweighted total score or count of all of the defects recorded, and the window 62 provides the weighted total score or count of all such defects.

The respective point score weights given to the various types of defects, of course, depend upon the type of material being inspected, since a defect of one type in a particular kind of material may be more or less serious than the same type of defect in another kind of material. Thus, the weighting is a matter of choice corresponding to the results which are to be achieved. Similarly, in determining the grade of the material, the defect density is also a factor to be considered, and this information is displayed at window 64 on panel 39. The defect density is determined by the number of defects per unit length of the material being inspected, and in the case illustrated the defects are shown per one thousand yards. In determining a grade for the material, different formulas may be employed, which formulas may take into account the number, type and density of defect occurring in the inspected material. Since all of such information is provided by the scores and counts maintained by the various registers of the memory means, the computer of the apparatus 20 utilizing a selected formula for that purpose, determines the grade of the goods and displays the result at the window 66 of panel 39 which in an example of this case shows a grade B.

When an inspection run is started, all of the registers and memory means of the apparatus 20 are reset to their initial condition whereby all information previously stored is removed. As material travels past the inspection station 12, pulses are received from the proximity transducer 32 for measuring the length of material 13 passing the station 12. The operator 15 depresses in sequence the keys 16 of the keyboard 14 as defects are noted, which information is recorded in the memory means by its registers and is at the same time printed out on the tape 38. As previously noted, the current counts of the registers for the various defects, as raw or weighted counts, by type and group are displayed at windows provided in the panel 39 of the apparatus 20. The total number of defects recorded as raw and weighted scores are also provided as well as the defect density and grade. This information is observable during the run.

At the end of the run, the operator 15 may take down such information which may be desirable from the windows of panel 39 or may actuate the final print button 71 on the console. This results in an automatic sequential printout of all the information recorded in the registers of the memory means as well as the computed densities and grade information, which information may include more information than is visibly displayed by the panel 39. The form of such printout information will be more apparent during the description provided below in connection with FIG. 3. The tape 38 with the printed information may now be removed from the apparatus 20 and attached to the roll of material which has been inspected, thereby providing a permanent record giving information as to the types of defects, their locations, as well as raw and weighted scores by types and groups of defects and the density of defects and computer grading of the material. The material thus may readily be evaluated and any of the defects detected during the inspection may be easily located. Since all of the information is printed out serially in digital form and not by using analog location methods, the information is in a concise and highly usable form.

Referring now to the block diagram of FIG. 3 for a more detailed description of inspection recorder means 10, the pulse generator 70 provides a pulse for each predetermined length of material 13 passing the inspection station and may take the form of the wheel 30 and proximity detector 32 for providing a pulse for each tenth of a yard of material or any other suitable length. The pulses from the generator 70 are delivered to a yardage counter 72 which may be a binary or decimal type counter with a capacity sufficient to maintain a count for the entire length of material which is to be inspected by means 10. An information coding means 74 may, as illustrated in FIG. 1, take the form of the keyboard 14 for providing a coded signal for each type and group of defect detected, or may receive information with regard to such defects from automatic detecting means. Each time the information coding means 74 provides an output signal, it is delivered over a line 76 and a line 78 through a program switching and control means 80 to a printer 82. Although for the purpose of the block diagram the lines 76 and 78 as well as other lines are shown as single lines, it is to be understood that such representations may comprise a plurality of lines for providing the coded information, control signal, or other outputs.

The program switching and control means 80 may comprise a stepping switch which is set in its first position during the inspection run, whereby information from the information coding means 74 is transmitted to the printer 82. Information from the yardage counter 72 is also delivered by the control 80 over a line 84 and the line 78 to the printer 82 when it is in its first position. Upon each delivery of an output signal from the information coding means 74, the printer 82 is actuated to print the code symbol for the type of defect detected together with the current yardage recorded by the yardage counter 72 at the time that the defect is detected. This information is printed by the printer 82 on the record sheet 38. As illustrated in FIG. 3, a two letter code is printed in the column designated by the arrow 86 identifying the type of defect, while the current yardage is printed in the column designated by the arrow 88, the information being printed in a row such as indicated by the arrow 90. Also appearing in the row with the printout of the type code for the defect and the current yardage, is the group to which the defect is assigned and the point weight for the particular type of defect. The group is printed in column indicated by the arrow 92 and the point weight or weighting factor is printed in the column designated by the arrow 94, all of the information pertaining to the particular defect being printed in a single row 90. With the detection of each defect and the delivery by the information coding means 74 of a coded signal, the printer 82 continues to print one row after another for providing the record of sheet 38. During the initial stage when the defects are being recorded, the first portion 96 of the sheet 38 provides a record of each detected defect (see FIG. 3). In the example provided, two groups of defects are identified by codes, as groups V and X, while the types of defects are identified by the two letter code designations AB, RA and CD. The type of defect AB is given a point weight factor of 3, while the defect RA has a point weight factor of 2 and the defect CD also has a point weight factor of 2, as illustrated. The yardage given in column 88 associated with each of the defects increases with time and is given in one-tenth of a yard increments providing high accuracy of location.

In the far right column, designated by the arrow 98, figures are given for the density of defects or the defects recorded for each 100 yards of material inspected. Thus at the first 100-yard increment, two defects are recorded, which are the previously recorded defects AB and RA, while at the 200-yard location, the density per 100-yard column 98 indicates a density of 3 for the three defects CD, AB and AB respectively detected during the next 100 yards. Although the types of defects have been limited to three and the groups have been restricted to two for illustration, many more types of defects and groups may be utilized. The portion 96 of the record sheet 32 illustrates a record made at the beginning of an inspection run and the length of the record sheet 38, of course, will depend upon the number of defects recorded and other information such as the density figures which are automatically recorded by the printer 82.

In order to provide the density information on a current basis as each 100 yards of material passes the inspection station 12, a 100-yard counter 100 also receives pulses from the pulse generator 70 and delivers an output signal on the line 102 after receiving 1,000 pulses, each pulse indicating a tenth of a yard. The output pulse from the counter 100 is delivered by the program switching and control means 80 in its first position over the line 78 to the printer 82, actuating the printer 82 to print information stored in the density register 104. The information in the register 104 is also delivered by the control 80 to the printer 82 over lines 106 and 78.

The density register 104 may be a counter of the binary type or any other suitable type which receives the output signals on line 76' from the information coding means. Each time such an output signal is received, the count of the density register 104 increases by 1. After the delivery of an output signal by the counter 100, the counter 100 is reset by the output signal and the output signal is also delivered over line 108 to reset the density register 104 to a zero reading. Thus, the density register starts counting anew after each 100 yards passes the inspection station. The register 104 delivers a count to the printer representing the total number of defects recorded during the passage of 100 yards of material by the inspection station 12.

Under certain circumstances, it is more informative to provide a weighted count for the defect density rather than the raw count of defects occurring during each 100 yards. For that purpose, a weight point compensator 110 is provided, which receives each code signal from the coding means 74 over line 76' and provides a count multiplied by a predetermined factor depending upon the type of defect. Thus for example the type of defect designated AB is given a point weight of 3 and therefore the weight point compensator 100 multiplies each count by 3. If the density register 104 is a pulse actuated counter, the compensator 110 will deliver 3 pulses in place of each AB signal received. Similarly with the defect type designated RA, in the example given, the compensator 110 will deliver two pulses for each defect of this type detected. The output signals from the compensator 110 are delivered over a line 113 to the density register 104 which now stores a weighted density figure which is delivered and recorded by the printer 82 as noted previously. Of course, if both types of information are required, multiple registers 104 are employed and both figures may be printed by the printer 82, or a selection may be made between the raw and the weighted density figures.

Information from the coding means 74 is also delivered to a plurality of defect type totalizers 112 which keep a current record of each of the respective defects represented by the coded signals from the coding means 74. Thus, as illustrated in the example given, in record sheet 38 in the initial portion 96 which records the type of defect, if 10 defects of the type designated AB have been recorded on the portion 96 of the recording sheet 38, the totalizer 112 for the defect type AB would show a total count of 10. As each additional defect AB is recorded, the total will increase by 1 for this type totalizer. Similarly, when other defects are recorded, the corresponding totalizers 112 will keep a current account of such recorded defects. The block 112 thus represents a plurality of registers which provide the totals respectively for each type of defect recorded. The information delivered to the totalizers 112 may be by a respective line 76' from the coding means 74 or may appear in time sequenced or parallel coded form which may be recognized by the totalizers 112 for effecting the count of the proper corresponding totalizer.

Similarly, defect totalizers 114 are provided, which like the defect type totalizers 112, receive signals on the line 76' from the information coding means 74 and keep a count of defects falling within respective preselected groups such as the groups V and X illustrated in the example. The totalizers 114 also provide a current count of all defects in their respective groups. The defect type totalizers 112 may be associated with the windows 40, 42 and 44 in the panel 39 shown in FIG. 2 for giving the score of the respective types of defects, while the totalizers 114 may display their group totals at the windows 52 and 54 respectively for groups X and V. Of course, many additional totalizers may be utilized which do not provide information for display by the panel 39.

A master defect totalizer 116 also receives signals over line 76' from the information coding means and counts each defect signal, thereby providing a current total count for all recorded defects. In FIG. 2, such information is provided by window 60 under the heading Total Defects, Raw Score on panel 39.

A plurality of weighted defect type totalizers 112' and weighted defect group totalizers 114' are provided corresponding to the defect type totalizers 112 and defect group totalizers 114. The totalizers 112' and 114' instead of receiving signals from over line 76' from the information coding means 74, derive input signals over line 113 from the weight point compensator 110. As previously noted, the compensator 110 provides output signals which are weighted or multiplied by a point factor corresponding to the particular type of defect represented by the signal over line 76 from the information coding machine 74. Thus, those defects which may be considered of greater detriment may be provided with a higher point weight than those defects of lesser importance. The counts maintained by the defect totalizers 112' and defect group totalizers 114' will be weighted in accordance with the predetermined weighting or multiplying factors assigned to such respective defects. A weighted master defect totalizer 116' is also provided corresponding to master defect totalizer 116 for providing the weighted total of all of the defects recorded.

The current totals of the weighted defect totalizers 112' are visually displayed at panel 39 through windows 46, 48 and 50, illustrating three types of defects, while the corresponding weighted group counts are provided at the windows 56 and 58. Similarly the weighted total defects are shown at window 62 corresponding to the raw score shown to its left at window 60.

A grading computer 118 is provided which receives information from line 84 of the yard counter 72, receives information from the totalizers 112, 114 and 116 over line 120 and output information from the totalizers 112', 114' and 116' over line 122. The grading computer 118 may process by any formula, the raw and/or weighted defects, by group or type, and total defects as well as the yardage inspected for determining the grade for the fabric. Such computers providing output information after performing mathematical operations on input information, are well known in the art. The output from the grading computer is delivered over line 124 to the program switching and control means 80, as is the output information over lines 120 and 122 respectively from the registers 112, 114, 116 and the registers 112', 114' and 116'.

When it is desired to print out the total figures accumulated by the registers of the memory means of the inspection recorder means 10, the totalizer button 71 on the printer section 34 shown in FIG. 1 is actuated. This results in the delivery of a signal from the final print and reset 126 (see FIG. 3) to the program switching and control means 80. Upon receipt of such signal, the control 80 is placed in its totalizer mode and performs a series of switching operations for serially printing out the information contained in the totalizers, as well as providing information as to density and grading.

In the totalizer mode, the control 80 proceeds by sequentially delivering the total count of each of the defect type totalizers 112 to the printer 80. The printer 80 prints this information in the total column 88 with the code designations identifying the information being printed. The raw scores for the total defects are printed out first, in the example provided by the portion 128 of the record sheet 38. Thus, from the illustration, it is noted that in the first row reading from left to right the letters RTAB provide identification of the raw total for the type defect AB, such total being shown to be 27 defects. The raw totals for the next three types of defects are given in rows one under another. Next, the control 80 delivers in sequence the weighted totals for the respective defects which are printed out in rows with their identifying symbols. For example, WTAB, identifies the weighted total for the defect AB which total is shown in the example to be 81. The totals for the other weighted defects follow.

The program switching and control 80, then provides the raw totals for the groups X and V by first switching information to the printer 82 from the group totalizers 114 and followed by delivering information from the group totalizers 114' for the serial presentation of the weighted group totals on the portion 128 of the record sheet 38. The information is identified by RTGX for the raw total for group X and by WTGX for the weighted total for group X. The group V raw and weighted totals respectively are identified by RTGV and WTGV with their totals given respectively to the right thereof.

As the next step, the program switching and control 80 delivers information from the master defect totalizer 116 to the printer 82 which prints, as illustrated, the designation RT00 0242.0 to designate the raw total for all of the defects. The program switching and control 80 next switches to provide the printing of the count of the weighted master defect totalizer 116 with the notation WT00 followed by 0422.0 to identify the weighted total for all of the recorded defects.

As the next to final step, information obtained from the grading computer 118 is delivered to the printer 82 which, in the example, prints out the designation 000B for indicating the grade determined by the computer 118 followed by the numeral 0844.0 representing the defect density total for the entire inspected material as the average number of defects per 1,000 yards. As the final step, the total yardage recorded in counter 72 is printed out on the last line giving the yardage of the material inspected. Of course the information provided in the totalizer mode may be printed out in any other order which may be desired.

The information which has been automatically and accurately printed out by the printer section 34 of the console (FIG. 1) may now be removed and attached to the roll of material 22 for showing the grade and any other recorded information which may be desirable for determining its utilization.

The totalizers, registers and counters utilized in the inspection recorder means 10 disclosed, may be of the conventional type utilizing flip-flop circuits or may be of any other suitable form well known in the art, and may use electronic means for providing visual information displays.

The printer 82 may be a high speed digital printing counter or any of the other well-known printing devices such as utilized in the computer and calculating arts.

The programming and switching control 80 may be, although not limited to, a stepping switch which is programmed to deliver information from the various registers and counters to the printer for recording defects as detected and periodic density information during an inspection run, and finally printing out the information stored in the registers as well as the grading information and the average density information provided at the end of an inspection run.

At the end of the totalizer mode of the program switching and control 80, the control 80 provides a reset signal on the output line 130 for delivery to the reset input leads R of the various counters and totalizers for returning same to their initial reset condition or zero count.

The printer section 34 is also provided with a reset button 68 which also produces a reset signal on line 130 when it is manually actuated whereby all of the totalizers and counters are reset at any time desired independent of the final print and reset operation.

While this invention has been described and illustrated with reference to a specific embodiment, it is to be understood that the invention is capable of various modifications and applications, not departing essentially from the spirit thereof, which will become apparent to those skilled in the art.

What is claimed is:

1. Inspection recorder means for recording defects in elongated sheet material traveling past an inspection station comprising measuring means for maintaining a current count of the length of material which travels past an inspection station, information coding means for providing a plurality of signals each signal corresponding to a defect of a corresponding plurality of types of defects in said material as it passes said inspection station, and recording means making a record of each signal from said coding means together with the count of said measuring means at the respective time each signal is provided by said coding means, said recording means making said record by serially printing information relating to the type of said defects together with its count as said signals are provided by said information coding means.

2. The means of claim 1 in which said recording means provides a record in digital form of the signals from said coding means with the corresponding counts of said measuring means for identifying and locating each defect being recorded.

3. The means of claim 1 in which said measuring means comprises a detector providing a pulse signal for each predetermined length of material passing said station, and a counter receiving said pulses and maintaining a current count of the length of material traveling past said inspection station.

4. The means of claim 3 in which said coding means comprises a keyboard with a plurality of keys for manual actuation for producing respective coded signals corresponding to a plurality of types of defects to be recorded.

5. The means of claim 1 including storage means for maintaining a count of the signals provided by the coding means corresponding to the number of defects detected.

6. The means of claim 5 in which said coding means comprises a keyboard with a plurality of keys for manual actuation for providing respective coded signals corresponding to a plurality of types of defects to be recorded and said recording means makes a record of the count of said storage means.

7. The means of claim 5 in which said coding means provides a plurality of signals respectively corresponding to a plurality of types of defects, and said storage means includes a plurality of defect registers each maintaining a weighted count corresponding to the respective type of defect provided by said corresponding plurality of signals, said weighted count being provided by multiplying the count of each signal provided by said coding means by a weighting factor corresponding to the type of defect.

8. The means of claim 5 in which said coding means provides a plurality of signals respectively corresponding to a predetermined plurality of groups and types of defects, and said storage means includes a plurality of defect group registers each maintaining a weighted count corresponding to the respective types of defects of one of said predetermined groups of defects provided by said corresponding plurality of signals, said weighted count being provided by multiplying the count of each signal provided by said coding means by a weighting factor corresponding to the type of defect.

9. The means of claim 5 in which said coding means provides a plurality of signals respectively corresponding to a plurality of types of defects, and said storage means includes a plurality of defect registers each maintaining a count of a respective type of defect provided by the corresponding plurality of signals of said coding means.

10. The means of claim 9 in which said storage means includes a plurality of weighted defect registers each maintaining a weighted count of one of said respective types of defects by registering a predetermined multiple count for each respective one of said plurality of signals provided by said coding means.

11. The means of claim 10 in which said coding means provides a plurality of signals respectively corresponding to a predetermined plurality of groups and types of defects, and said storage means includes a plurality of defect group registers each maintaining a count of defects of a type included in a predetermined group provided by the corresponding plurality of signals of said coding means and a plurality of weighted defect group registers each maintaining a weighted count of the types of defects in one of said predetermined groups of defects by registering a predetermined multiple count for each respective one of said plurality of signals provided by said coding means.

12. The means of claim 11 in which said coding means comprises a keyboard with a plurality of keys for providing respective coded signals corresponding to said groups and types of defects to be recorded.

13. The means of claim 9 in which said coding means provides a plurality of signals respectively corresponding to a predetermined plurality of groups and types of defects, and said storage means includes a plurality of defect group registers each maintaining a count of defects of a type included in a predetermined group provided by the corresponding plurality of signals of said coding means.

14. Inspection recorder means for recording defects in elongated sheet material traveling past an inspection station comprising measuring means for maintaining a current count of the length of material which travels past an inspection station, information coding means for providing a signal corresponding to a defect in said material as it passes said inspection station, and recording means making a record of each signal from said coding means together with the count of said measuring means at the respective time each signal is provided by said coding means, said measuring means comprising a detector providing a pulse signal for each predetermined length of material passing said station, and a counter receiving said pulses and maintaining a current count of the length of material traveling past said inspection station, said coding means comprising a keyboard with a plurality of keys for manual actuation for producing respective coded signals corresponding to a plurality of types of defects to be recorded, said recording means printing on a record sheet responsive to actuation of a key of the keyboard of said coding means the current count of the counter of said measuring means at the time said key was actuated together with a designation for the defect corresponding to said actuated key, said recording means printing such data serially as the keys of said keyboard are actuated in sequence.

15. Inspection recorder means for recording defects in elongated sheet material traveling past an inspection station comprising measuring means for maintaining a current count of the length of material which travels past an inspection station, information coding means for providing a signal corresponding to a defect in said material as it passes said inspection station, recording means making a record of each signal from said coding means together with the count of said measuring means at the respective time each signal is provided by said coding means, and storage means for maintaining a count of the signals provided by the coding means corresponding to the number of defects detected, said measuring means providing an output signal after each passage of a predetermined length of material past said inspection station, said storage means including a density register maintaining a count of the signals corresponding to defects provided by the coding means beginning in each instance after the occurrence of an output signal provided by said measuring means, and said recording means making a record of the current count of said measuring means and the count of said density register upon the occurrence of an output signal from said measuring means, whereby the location of said material is identified by the recorded count of said measuring means and the density of defects or number of defects for said predetermined length of material is given by the recorded count of said density counter.

16. The means of claim 15 in which said coding means comprises a keyboard with a plurality of keys for manual actuation for providing respective coded signals corresponding to a plurality of types of defects to be recorded.

17. Inspection recorder means for recording defects in elongated sheet material traveling past an inspection station comprising measuring means for maintaining a current count of the length of material which travels past an inspection station, information coding means for providing a signal corresponding to a defect in said material as it passes said inspection station, recording means making a record of each signal from said coding means together with the count of said measuring means at the respective time each signal is provided by said coding means, and storage means for maintaining a count of the signals provided by the coding means corresponding to the number of defects detected, said coding means providing a plurality of signals respectively corresponding to a plurality of types of defects, and said storage means including a plurality of defect registers each maintaining a count of a respective type of defect provided by the corresponding plurality of signals of said coding means, said recording means making a record of the total count of each of said defect registers at the termination of an inspection run of said sheet of material.

18. Inspection recorder means for recording defects in elongated sheet material traveling past an inspection station comprising measuring means for maintaining a current count of the length of material which travels past an inspection station, information coding means for providing a signal corresponding to a defect in said material as it passes said inspection station, recording means making a record of each signal from said coding means together with the count of said measuring means at the respective time each signal is provided by said coding means, and storage means for maintaining a count of the signals provided by the coding means corresponding to the number of defects detected, said coding means providing a plurality of signals respectively corresponding to a plurality of types of defects, and said storage means including a plurality of defect registers each maintaining a count of a respective type of defect provided by the corresponding plurality of signals of said coding means, said storage means including a plurality of weighted defect registers each maintaining a weighted count of one of said respective types of defects by registering a predetermined multiple count for each respective one of said plurality of signals provided by said coding means, said recording means making a record of the total count of respective ones of said defect registers and weighted defect registers together with a total identification designation for the respective defect and weighted defect to which said totals correspond, said recording means making a record on a record sheet of the said total counts with their corresponding said designations in sequence at the end of an inspection run of said sheet material.

19. Inspection recorder means for recording defects in elongated sheet material traveling past an inspection station comprising measuring means for maintaining a current count of the length of material which travels past an inspection station, information coding means for providing a signal corresponding to a defect in said material as it passes said inspection station, recording means making a record of each signal from said coding means together with the count of said measuring means at the respective time each signal is provided by said coding means, and storage means for maintaining a count of the signals provided by the coding means corresponding to the number of defects detected, said coding means providing a plurality of signals respectively corresponding to a plurality of types of defects, and said storage means including a plurality of defect registers each maintaining a count of a respective type of defect provided by the corresponding plurality of signals of said coding means, said storage means including a plurality of weighted defect registers each maintaining a weighted count of one of said respective types of defects by registering a predetermined multiple count for each respective one of said plurality of signals provided by said coding means, said coding means providing a plurality of signals respectively corresponding to a predetermined plurality of groups and types of defects, and said storage means including a plurality of defect group registers each maintaining a count of defects of a type included in a predetermined group provided by the corresponding plurality of signals of said coding means and a plurality of weighted defect group registers each maintaining a weighted count of the types of defects in one of said predetermined groups of defects by registering a predetermined multiple count for each respective one of said plurality of signals provided by said coding means, said recording means making a record of the total count of respective ones of said defect registers, weighted defect registers, defect group registers and weighted group registers together with a total identification designation for the respective defect, weighted defect, defect group and weighted defect group to which said totals correspond, said recording means making a record on a record sheet of the said total counts with their corresponding said designations in sequence at the end of an inspection run of said sheet material.

20. The means of claim 19 including a grading computer receiving information from the said storage means and said measuring means and providing a grade designation based upon said information, and in which said recording means makes a record of said grade on said record sheet at the end of an inspection run of said sheet material.

* * * * *